US009795902B2

(12) United States Patent
Rickenbach

(10) Patent No.: US 9,795,902 B2
(45) Date of Patent: Oct. 24, 2017

(54) FILTER CARTRIDGE AND FILTER DEVICE

(71) Applicant: Manuel Rickenbach, Bilten (CH)

(72) Inventor: Manuel Rickenbach, Bilten (CH)

(73) Assignee: ELYSATOR Genossenschaft, Bilten (CH)

(*) Notice: Subject to any disclaimer, the term of this patent is extended or adjusted under 35 U.S.C. 154(b) by 62 days.

(21) Appl. No.: 14/205,311

(22) Filed: Mar. 11, 2014

(65) Prior Publication Data
US 2014/0251891 A1 Sep. 11, 2014

(51) Int. Cl.
B01D 24/16 (2006.01)
C02F 1/42 (2006.01)
C02F 1/00 (2006.01)
B01D 24/10 (2006.01)

(52) U.S. Cl.
CPC .......... B01D 24/167 (2013.01); B01D 24/10 (2013.01); C02F 1/001 (2013.01); C02F 1/42 (2013.01); B01D 24/165 (2013.01); C02F 2201/006 (2013.01); C02F 2301/04 (2013.01); C02F 2301/043 (2013.01)

(58) Field of Classification Search
CPC .... B01D 24/165; B01D 24/167; B01D 24/10; C02F 1/42; C02F 2001/422; C02F 2001/425; C02F 2001/427; C02F 2201/006; C02F 2301/04; C02F 2301/043
USPC ........ 210/282, 289, 434; 422/274, 275, 282, 422/484
See application file for complete search history.

(56) References Cited

U.S. PATENT DOCUMENTS

| | | | | |
|---|---|---|---|---|
| 3,321,085 A | * | 5/1967 | Moorhead | C02F 1/42 210/232 |
| 3,741,394 A | * | 6/1973 | Defenbaugh | B01D 27/02 210/282 |
| 3,864,090 A | | 2/1975 | Richards | |
| 3,883,428 A | * | 5/1975 | Waring | B01D 15/00 210/266 |

(Continued)

FOREIGN PATENT DOCUMENTS

FR 2949457 3/2011

OTHER PUBLICATIONS

Switzerland Search Report, Swiss Application 00576/13, dated Oct. 31, 2013.

Primary Examiner — Matthew O Savage
(74) Attorney, Agent, or Firm — Edward B Weller

(57) ABSTRACT

A filter cartridge (5) with a housing enclosing a filter volume filled to about 80% with a filter granulate (15) is screwed into a joint (7) of a connecting piece (1) by means of a port (12) ending in an outflow opening (13) and being connected to an outlet line formed by a second fitting (3), and surrounded with a distance by a casing (4) that is screwed to the connecting piece (1). An inlet line formed by a first fitting (2) opens into an intermediate volume (6) lying between the casing (4) and the outer side of the filter cartridge (5) in such a way that untreated water enters into the outlet line via the intermediate volume (6) and through the bottom (9) which is perforated by slots (10), the filter granulate (15), the intermediate floor (11) that is likewise slotted and the port (12). In order to reduce the flow resistance, the port (12) is provided with bypass openings (14) to allow untreated water to pass also directly out of the intermediate volume (6) into the port (12).

14 Claims, 1 Drawing Sheet

(56) References Cited

U.S. PATENT DOCUMENTS

| | | | |
|---|---|---|---|
| 4,347,224 A | | 8/1982 | Beckert et al. |
| 5,250,187 A | * | 10/1993 | Franks ...................... C02F 1/42 |
| | | | 210/269 |
| 5,707,536 A | * | 1/1998 | Meissner ............... B01D 24/12 |
| | | | 210/266 |
| 2007/0289913 A1 | * | 12/2007 | Namur .................. A47J 31/605 |
| | | | 210/260 |

* cited by examiner

U.S. Patent  Oct. 24, 2017  US 9,795,902 B2
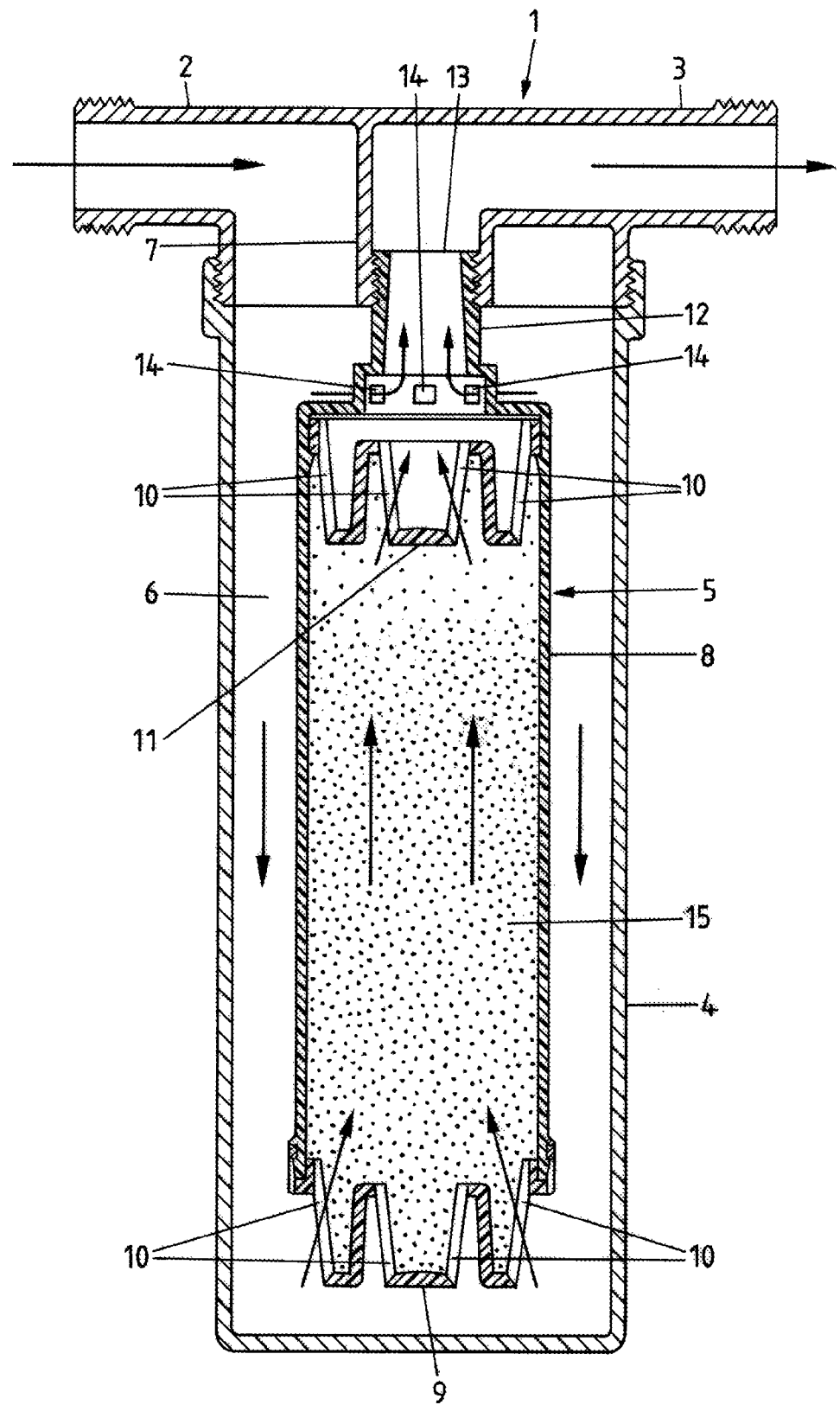

FILTER CARTRIDGE AND FILTER DEVICE

RELATED APPLICATIONS

This application claims the benefit of priority under 35 USC §119 to Switzerland Patent Application No. 00576/13 filed on Mar. 11, 2013, the entire contents of which are incorporated herein by reference.

FIELD OF THE INVENTION

The invention relates to a filter cartridge and a filter device as utilized for the cleaning and, more specifically, for the desalination of water in technical cycles.

PRIOR ART

Filter cartridges of the generic type and filter devices comprising such filter cartridges have been known for a long time. They are used in technical cycles, e. g. in heating or cooling installations, in order to desalinate water and thus prevent corrosion and sedimentation in the installation.

For this purpose, filter devices are usually utilized where at least during the filling of an installation with water the latter is completely passed through the filter volume of the filter cartridge. This creates a high flow resistance at the filter cartridge, which in turn requires correspondingly strong pumps and a high pressure resistance of the installation.

From U.S. Pat. No. 4,347,224 A a device is known which, with respect to its constitution, corresponds largely with the proposed filter device. However, the device is a dispenser where the refillable cartridge contains a water-soluble chemical which is released into a cycle.

SUMMARY OF THE INVENTION

The object of the invention is to propose a filter cartridge which allows to clean the water in such a way that the flow resistance in the cycle is not significantly increased. This object is achieved by the invention as characterized in the claims. In addition, a filter device containing the filter cartridge according to the invention is proposed.

BRIEF DESCRIPTION OF THE DRAWINGS

In the following the invention is explained in more detail with reference to a drawing showing an embodiment.

FIG. 1 shows a partially schematic cross-section through a filter device according to the invention.

DETAILED DESCRIPTION

As used herein, the term "cycle" includes a closed system of conduits (such as tubes) with a circulating fluid. The closed system can include, for example, central heating systems, heating installations, and cooling installations. The cycles described herein can be used, for example, for desalination of water.

The filter device has a filter housing that comprises a connecting piece 1 having a first fitting 2 forming an inlet line and a second fitting 3 forming an outlet line. The connecting piece 1, which preferably is made of metal, e. g. aluminum, steel or copper, can be screwed into a line of a technical cycle, e.g. of a heating installation, in a well-known manner. It is possible to provide a valve in the first fitting 2 and in the second fitting 3, respectively.

The filter housing further comprises a cylindrical casing 4 screwed onto a flange of the connecting piece 1. It encloses, with a certain distance, a filter cartridge 5 according to the invention that is also essentially cylindrical, in such a way that an intermediate volume 6 into which the inlet line opens lies between the casing 4 and one outer side of the filter cartridge 5. The connecting piece 1 further presents a joint 7 for the connection of the filter cartridge 5, the joint being connected to the outlet line.

The filter cartridge 5 presents a housing made of plastic, the housing comprising a barrel-shaped side wall 8, a corrugated bottom 9 forming a transverse wall at an inlet area at a lower end of the side wall 8 and being provided with a plurality of openings in the form of slots 10, and a corrugated intermediate floor 11 also forming a transverse wall at an outlet area at an upper end, wherein the intermediate floor is essentially configured in the same manner as the bottom 9, more specifically it is also provided with a plurality of openings configured as slots 10. Immediately above the intermediate floor 11, an essentially cylindrical port 12 connects to the side wall 8 via an annular intermediate piece, the port 12 connecting the intermediate floor 11 to an outflow opening 13 of the filter cartridge 5 that opens into the outlet line. The port 12 presents an external thread on its upper end and is screwed into the joint 7.

At a slightly enlarged area following the annular intermediate piece the port 12 is perforated by a plurality of bypass openings 14 distributed evenly about its circumference, the openings 14 connecting the intermediate volume 6 surrounding the outer side of the filter cartridge 5 with the interior of the port 12 and thus with the outflow opening 13.

Between the bottom 9 and the intermediate floor 11 lies a filter volume that is totally or partially, for example, up to between 50% and 90%, in particular, up to about 80%, filled with a filter granulate 15 that is insoluble in water. The filter granulate 15 may consist entirely or in part of an ion exchange resin, and has a particle size that is just large enough to prevent it from escaping through the slots 10 and to hold it reliably in the filter volume that is delimited by the bottom 9 on the lower side and the intermediate floor 11 on the upper side.

Untreated water flowing in through the first fitting 2 reaches the intermediate volume 6 and flows in part along the outer side of the filter cartridge 5 to the bottom of the casing 4 where it enters into the filter volume through the slots 10 in the bottom 9 of the filter cartridge 5. It then passes through the filter granulate 15 upwards from below, reaches the outflow opening 13 via the slots 10 in the intermediate floor 11 and the port 12 and then flows out through the second fitting 3. However, a portion of the untreated water directly passes through the bypass openings 14 from the intermediate volume 6 into the interior of the port 12 where it is mixed with the filtered water and also flows out through the second fitting 3.

The bypass openings 14 are dimensioned in such a way that they reduce the flow resistance as a whole sufficiently, but that the flow through the filter volume is adjusted in such a way that, on the one hand, it is sufficient to slightly stir up the filter granulate 15 in order to prevent it from blocking the slots 10 in the bottom 9 and to keep the flow resistance as low as possible here too, but that, on the other hand, it is not as strong as to cause blocking of the slots 10 in the intermediate floor 11. In order to allow raising of the filter granulate 15, the latter should not fill the filter volume in total, but preferably only to about 80%. In this way, the water in a technical cycle will be completely desalinated usually in the course of a few days. The filter cartridge 5 may then be removed and replaced by a different insert, e.g. by a micro-bubbles separator.

LIST OF REFERENCE SYMBOLS 1 connecting piece
2 first fitting
3 second fitting
4 casing
5 filter cartridge
6 intermediate volume
7 joint
8 side wall
9 bottom
10 slot
11 intermediate floor
12 port
13 outflow opening
14 bypass opening
15 filter granulate

The invention claimed is:

1. A filter cartridge comprising:
a cartridge housing that has a circumferential side wall enclosing a filter volume filled at least partially with a filter granulate, a first transverse wall permeable to fluid flow, having openings sized to retain the filter granulate in the filter volume, the first transverse wall being configured as a bottom arranged at a lower end of the side wall and closing off the filter volume at an inlet area, and a second transverse wall permeable to fluid flow, spaced apart from the first transverse wall, being configured as an intermediate floor arranged at an upper end of the side wall and having openings sized to retain the filter granulate in the filter volume, the second transverse wall closing off the filter volume at an outlet area, and including a port leading from the second transverse wall to an outflow opening, wherein the port has at least one bypass opening connecting one outer side of the filter cartridge to the outflow opening.

2. The filter cartridge according to claim 1, wherein the port is perforated by a plurality of bypass openings distributed around its circumference.

3. The filter cartridge according to claim 1, wherein the side wall is configured approximately as a cylinder surface.

4. The filter cartridge according to claim 1, wherein the port has an approximately cylindrical configuration and connects to the side wall by an annular intermediate piece arranged immediately above the second transverse wall.

5. The filter cartridge according to claim 4, wherein the port presents an external thread.

6. The filter cartridge according to claim 1, wherein the openings in the bottom and in the intermediate floor are respectively configured as slots.

7. The filter cartridge according to claim 1, wherein the filter granulate takes up between 50% and 90% of the filter volume.

8. The filter cartridge according to claim 1, wherein the filter granulate includes ion exchange resin.

9. A filter device having a filter comprising:
a cartridge housing that has a circumferential side wall enclosing a filter volume filled at least partially with a filter granulate, a first transverse wall permeable to fluid flow, having openings sized to retain the filter granulate in the filter volume, the first transverse wall closing off the filter volume at an inlet area, and a second transverse wall permeable to fluid flow, spaced apart from the first transverse wall and having openings sized to retain the filter granulate in the filter volume, the second transverse wall closing off the filter volume at an outlet area, and including a port leading from the second transverse wall to an outflow opening, wherein the port has at least one bypass opening connecting one outer side of the filter cartridge to the outflow opening, and having a filter housing surrounding the filter cartridge so that an intermediate volume lies between the filter housing and the outer side of the filter cartridge, comprising:
a first fitting forming an inlet line opening into the intermediate volume,
a second fitting forming an outlet line and
a joint connected to the second fitting to which the port of the filter cartridge is connected, wherein the intermediate volume forms an unobstructed passage between the inlet line and the inlet area.

10. The filter device according to claim 9, wherein the filter housing comprises a casing surrounding the intermediate volume, being spaced apart from the filter cartridge at a distance.

11. The filter device according to claim 10, wherein the first fitting, the second fitting and the joint are each part of a connecting piece of the filter housing, and wherein the casing is screwed to the connecting piece.

12. The filter device according to claim 9, wherein the first transverse wall is configured as a bottom arranged at a lower end of the side wall, and the second transverse wall is configured as an intermediate floor at an upper end of the side wall.

13. A method for filtering a fluid in a closed system, the method comprising:
providing fluid to an inlet area of a filter cartridge, wherein the filter cartridge comprises:
a housing that has a circumferential side wall enclosing a filter volume filled at least partially with a filter granulate, a first transverse wall including openings, the transverse wall closing off the filter volume at an inlet area to receive said fluid, and a second transverse wall spaced apart from the first transverse wall and including openings, the second transverse wall closing off the filter volume at an outlet area to expel fluid, and including a port leading from the second transverse wall to an outflow opening, the port includes at least one bypass opening connecting one outer side of the filter cartridge to the outflow opening,
expelling fluid from the outlet area of the filter cartridge; and
circulating fluid through the closed system from the outlet area to the inlet area of the filter cartridge.

14. The method of claim 13, wherein the housing comprises:
a first fitting forming an inlet line opening into an intermediate volume surrounding the outer side of the filter cartridge,
a second fitting forming an outlet line and
a joint connected to the second fitting to which the port of the filter cartridge is connected.

* * * * *